(12) United States Patent
Fendt

(10) Patent No.: US 6,218,739 B1
(45) Date of Patent: Apr. 17, 2001

(54) PROCEDURE FOR THE FUNCTIONAL TESTING OF A VEHICLE OCCUPANT PROTECTION SYSTEM AS WELL AS A TEST CIRCUIT FOR IMPLEMENTING THE PROCEDURE

(75) Inventor: Guenter Fendt, Schrobenhausen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/264,338

(22) Filed: Mar. 8, 1999

(30) Foreign Application Priority Data

Apr. 4, 1998 (DE) .............................. 198 15 181

(51) Int. Cl.$^7$ ................................... B60R 21/32
(52) U.S. Cl. ................... 307/10.1; 340/438; 280/735
(58) Field of Search .................... 307/10.1; 340/436, 340/438; 280/734, 735

(56) References Cited

U.S. PATENT DOCUMENTS

| | | | |
|---|---|---|---|
| 3,863,208 | * | 1/1975 | Balban .................................. 340/52 |
| 4,163,268 | | 7/1979 | Spies et al. . |
| 5,187,465 | * | 2/1993 | Stonerook et al. ................. 340/438 |
| 5,446,442 | | 8/1995 | Swart et al. . |
| 5,596,497 | | 1/1997 | Honda . |
| 5,621,326 | | 4/1997 | Watanabe et al. . |

FOREIGN PATENT DOCUMENTS

| | | |
|---|---|---|
| 2614491 | 10/1977 | (DE) . |
| 9001803 U | 6/1990 | (DE) . |
| 9217359 | 4/1993 | (DE) . |
| 4408382A1 | 9/1995 | (DE) . |
| 0494859 | 7/1992 | (EP) . |
| 0806323 | 11/1997 | (EP) . |
| WO98/12569 | 3/1998 | (WO) . |

* cited by examiner

*Primary Examiner*—Fritz Fleming
(74) *Attorney, Agent, or Firm*—W. F. Fasse; W. G. Fasse

(57) ABSTRACT

A procedure for the functional testing of a vehicle occupant protection system, as well as a corresponding test circuit, detect a short-circuiting of components in the parallel ignition circuits of the vehicle occupant protection system. In order to achieve this, a change in voltage potential will be produced in one ignition circuit without triggering the ignitor, and it will then be tested in the other ignition circuits whether there is a corresponding shift in a closed circuit potential. By means of the disable control system of the comparator of the respective ignition circuit influenced in this way, and the linking of all comparators of the other ignition circuits, a short-circuiting fault signal can be generated easily and simply.

19 Claims, 1 Drawing Sheet

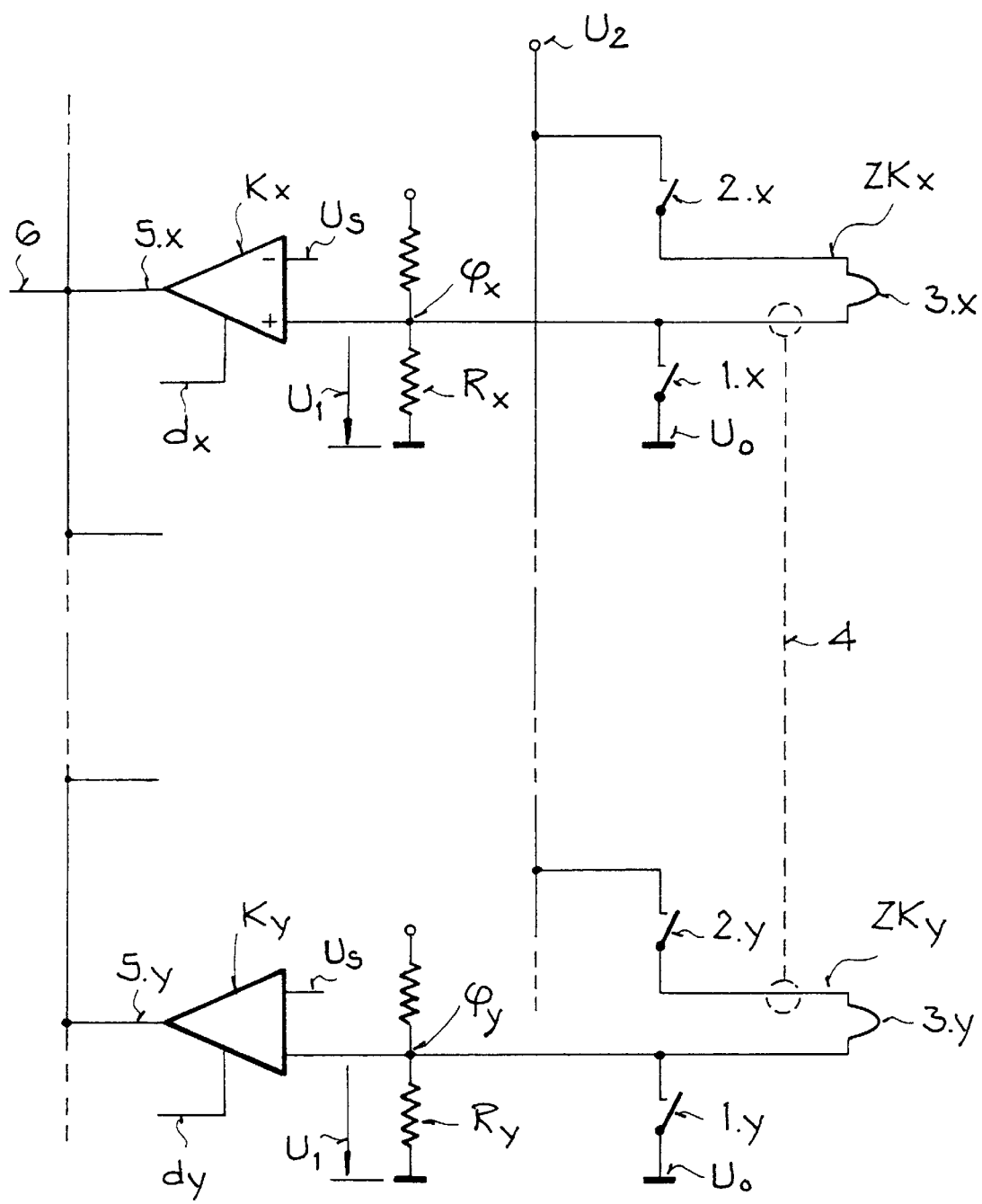

PROCEDURE FOR THE FUNCTIONAL TESTING OF A VEHICLE OCCUPANT PROTECTION SYSTEM AS WELL AS A TEST CIRCUIT FOR IMPLEMENTING THE PROCEDURE

FIELD OF THE INVENTION

The invention concerns a procedure for the functional testing of a vehicle occupant protection system having plural separate ignition circuits for triggering the igniters of plural occupant protection devices as well as a test circuit for implementing this procedure.

BACKGROUND INFORMATION

German Utility Model DE 92 17 359 U1 contains a circuit layout for the functional testing of a multistage transistor circuit as used in the ignition circuits of vehicle occupant protection systems. Their use in airbag trigger circuits is explicitly mentioned.

In addition, there are a large number of vehicle occupant protection systems available in the market where a central processing unit, or possibly even several output stages distributed within the vehicle, each trigger several ignition circuits for the igniters of vehicle occupant protection systems, in particular pyrotechnic igniters of airbag or belt tensioning gas generators. The output stages are usually integrated as Application Specific Integrated Circuits (ASICs) and feature the corresponding switching means for the ignition circuits to be controlled. Via connection lines, the proper ignitors will then be connected. DE 92 17 359 U1 contains a test circuit which, in the ignition circuit, will test the ignition circuit, in particular the switching means within such a circuit, by means of test currents which are very low when compared with actual trigger currents. The test is carried out by comparing any occurring changes in voltage potential with threshold values.

However, short-circuiting of components in or across parallel ignition circuits will so far not be detected. This type of short-circuiting may occur either within the ASIC—caused by damaged insulation areas between the various individual switching means—or by insulation defects in the connection lines from the functional unit, e.g. ASIC, to the ignitors.

SUMMARY OF THE INVENTION

The invention provides a procedure for the functional testing of a vehicle occupant protection system as well as a suitable test circuit by means of which even a short-circuiting of components in or across the parallel ignition circuits of an output stage will be detected.

Accordingly, in each ignition circuit, a predefined position of the switching means will be generated; and it will then be tested in the other ignition circuits as to whether these also show changes in voltage potential. This test is extremely easy to implement and does not require any great circuitry. Moreover, this test will determine whether an improper coupling, e.g. a short-circuit, between respective ignition circuits exists and causes an improper voltage change in a non-energized second ignition circuit when a first ignition circuit parallel thereto is energized.

BRIEF DESCRIPTION OF THE DRAWING

In the following, the invention will be further described in connection with an example embodiment, with reference to the single drawing FIGURE, which illustrates a test circuit for the detection of the short-circuiting of components in the parallel ignition circuits of an output stage.

DESCRIPTION OF PREFERRED EMBODIMENTS

The FIGURE illustrates a test circuit for the detection of the short-circuiting of components in the parallel ignition circuits of an output stage. The FIGURE shows the ignition circuits $ZK_x$ and $ZK_y$ of an output stage with n ignition circuits, with $1 \leq x < y \leq n$. In each ignition circuit $ZK_x$, there is an ignitor 3.x as well as at least one means of switching connected in series; in this particular embodiment, this will be a lowside switch 1.x to ground $U_0$ and a highside switch 2.x to ignition voltage $U_2$. By closing both means of switching, 1.x and 2.x, the ignition circuit $ZK_x$ will be closed and the ignitor 3.x triggered. In the closed-circuit state, the high-ohmic voltage potential $U_1$, which represents the closed-circuit potential and is impressed via resistor Rx, will occur on the ignitor 3.x. On the potential tap point ($\phi_x$ within ignition circuit $ZK_x$—which, in this example, is located between ignitor 3.x and the lowside switch 1.x—the potential will be permanently monitored by means of the comparator Kx. A threshold value $U_s$ is applied to the inverting input of the comparator Kx; this threshold value is aligned between the closed circuit potential $U_1$ and the nominal potential $U_0$ occurring when the lowside switch 1.x is closed. But the comparator Kx generates an output signal 5.x only when the disable signal $d_x$ has not been set to active.

If, for example, the closed circuit potential $U_1$ is set to 2 volts (via resistor Rx), and the ground potential $U_0$ is defined with 0 volts, then 1 volt would need to be assumed as a threshold value for example. If, subsequently, the highside switch 2.x is to be tested also, the closed circuit potential $U_1$ may need to be adapted in addition to the threshold value $U_s$, in order to prevent the voltage difference between the ignition voltage $U_2$ and the closed circuit potential $U_1$ to reach a stage where the ignitor 3.x may ignite. The threshold value $U_s$ will then need to be aligned between the value of the ignition voltage $U_2$ and any adapted value of closed circuit potential $U_1$.

The design of ignition circuit $ZK_y$ is identical, and respectively characterized by means of the index "y" rather than the index "x".

It is essential for implementing the procedure according to the invention that, when driving the ignition circuit $ZK_x$, preferably all other ignition circuits $ZK_{1, \ldots, x-1, x+1, \ldots n}$ will be tested with regard to a change in voltage potential. In this respect, the FIGURE shows just such a short-circuiting of components in parallel ignition circuits (4) between the ignition circuit $ZK_x$ and the ignition circuit $ZK_y$, which may occur due to insulation faults in the lines or within the output stages between the ignition circuits (mostly designed as ASICs). If, in ignition circuit $ZK_x$, the lowside switch 1.x is closed, the voltage on the potential tap point $\phi_x$ will change from the closed circuit potential $U_1$ to the ground potential $U_0$. However, the comparator Kx in ignition circuit x will be deactivated by means of the disable signal $d_x$ so that no output signal 5.x is set. All other ignition circuits, in particular even ignition circuit $ZK_y$, are active and test the potential on the potential tap point $\phi$, which for ignition circuit $ZK_y$ is $\phi_y$. Now, if—as shown in the FIGURE—a short-circuiting of components in parallel ignition circuits (4) occurs, the potential on the potential tap point $\phi_y$ will change, in spite of open switching means 1.y and 2.y. However, this will be detected via the comparator Ky, which has not been deactivated, in comparison with the threshold value $U_s$. The comparator Ky will set a corresponding output signal 5.y. However, due to the disable control system by means of the disable signals $d_1 \ldots d_x, d_y \ldots d_n$ for the n ignition circuits, it will be particularly easy to link these output signals 5.1 to 5.n by means of a logical AND link, in that the outputs of all comparators K1 ... Kx, Ky, ... Kn, are connected up as open collector outputs. Here, the logical AND link results from the potential of this connection being caused to change already by a single low level deviating from the standard high level—and which low level is significant for the short-circuiting of components in parallel ignition circuits—such that the common output signal 6 changes correspondingly from High to Low. Here, the disable control system by means of the disable signals $d_1 \ldots d_n$ ensures that the comparator Kx of the respective controlled or energized ignition circuit $ZK_x$ does not itself set an output signal 5.x as this would naturally have to have the corresponding change in voltage potential.

In principle, this procedure as well as the test circuit shown are also suitable for highside switches by appropriately adapting the threshold value $U_s$ as described above and changing over the comparator inputs.

Such a test circuit may either be arranged outside the ASIC of the ignition stage, by respectively providing pins for the potential tap points, or, preferably, such a test circuit may be implemented as a circuit integrated into the ASIC as in this way—via a corresponding disable control system without additional components—the ignition circuit (for example, the switching means arranged therein) mistuned by the change in potential during functional testing may be tested for simple faults, as well as—subsequently—the other ignition circuits for short-circuiting of components in parallel ignition circuits.

The particular significance of this becomes clear if it is taken into account that the number of occupant protection systems in motor vehicles will increase significantly in the future, leading to a significantly higher number of ignition circuits and a corresponding multiplication of short-circuiting possibilities.

What is claimed is:

1. Procedure for the functional testing of a vehicle occupant protection system,
   a) with the vehicle occupant protection system having at least one output stage featuring several ignition circuits controllable by switching means for ignitors of vehicle occupant protection devices of the system,
   b) with a test circuit being provided for each ignition circuit,
      b1) which test circuit, starting from a starting circuit potential, will generate at least one nominal potential by controlling the switching means, and
      b2) which test circuit will detect from changes in voltage potential occurring within the ignition circuit, when compared to the starting circuit potential, whether the ignition circuit and in particular the switching means arranged therein is intact, and
   c) while a first ignition circuit of the output stage is driven into the nominal potential, at the same time at least one additional ignition circuit will also be tested for changes in voltage potential, and, if a change in voltage potential occurs within such an additional ignition circuit, a short-circuiting fault will be detected between these two ignition circuits.

2. Procedure according to claim 1, wherein, if the first ignition circuit of the output stage is driven into the nominal potential then all other additional ignition circuits of this output stage will at the same time be tested for changes in voltage potential.

3. Test circuit for implementing a procedure for the functional testing of a vehicle occupant protection system which features at least one control system for switching means within ignition circuits of the occupant protection system, as well as a comparator for each of said ignition circuits the actual input of which comparator is connected to a potential tap point in the respective ignition circuit and the nominal input of which comparator is connected to a threshold value between a closed circuit potential and a nominal potential, and on the output of which comparator a short-circuit fault dependent signal will be generated when a short-circuit fault exists between two of said ignition circuits.

4. Test circuit according to claim 3, wherein the outputs of the comparators of an output stage are logically AND linked, and all of the comparators feature a disable control system which will be active respectively for that comparator in the associated ignition circuit of which controlling is effected.

5. Test circuit according to claim 4, wherein the comparator outputs are open collector outputs and logically AND linked via an electrical connection.

6. Test circuit according to claim 3, wherein each said ignition circuit comprises a highside switch and a lowside switch, a potential tap point and a corresponding nominal potential for both of said switches.

7. Test circuit according to claim 3, wherein the test circuit is integrated with the switching means of the ignition circuits within an output stage.

8. Procedure according to claim 1, wherein the at least one additional ignition circuit is not driven into the nominal potential while being tested for changes in voltage potential.

9. A method for functionally testing a vehicle occupant protection system including a first occupant protection device, a first ignition circuit connected to said first occupant protection device and adapted to selectively trigger an activation of said first occupant protection device, a second occupant protection device, and a second ignition circuit connected to said second occupant protection device and adapted to selectively trigger an activation of said second occupant protection device, wherein said method comprises the following steps:
   a) causing a test current to flow in at least a portion of said first ignition circuit;
   b) during said step a), detecting a first test voltage at a first test point in said first ignition circuit;
   c) if said first test voltage detected in said step b) is outside of an acceptable first test voltage range, then responsively thereto indicating a first fault exists in said first ignition circuit,
   d) during said step a), detecting a second test voltage at a second test point in said second ignition circuit;
   e) if said second test voltage detected in said step d) is outside of an acceptable second test voltage range, then responsively thereto indicating a cross-coupling fault exists between said first ignition circuit and said second ignition circuit.

10. The method according to claim 9, wherein said second test voltage at said second test point in said second ignition circuit is influenced by a leakage current leaking through said cross-coupling fault between said first ignition circuit and said second ignition circuit.

11. The method according to claim 9, wherein said step d) is carried out simultaneously with said step b).

12. The method according to claim 11, wherein said step d) is carried out without actively applying a test current directly to said second ignition circuit.

13. The method according to claim 9, wherein said step d) is carried out without actively applying a test current directly to said second ignition circuit.

14. A method for functionally testing a vehicle occupant protection system including a first occupant protection device, a first ignition circuit that includes a first triggering switch and that is connected to said first occupant protection device and adapted to selectively trigger an activation of said first occupant protection device, a second occupant protection device, and a second ignition circuit that includes a second triggering switch and that is connected to said second occupant protection device and adapted to selectively trigger an activation of said second occupant protection device, wherein said method comprises the following steps:
- a) while applying an input test voltage to said first ignition circuit, switching said first trigger switch from an open state to a closed state, and then detecting a first resultant test voltage at a first test point in said first ignition circuit;
- b) if said first resultant test voltage detected in said step a) is outside of an acceptable first voltage range, then responsively thereto indicating a first fault exists in said first ignition circuit;
- c) during said step a), detecting a second resultant test voltage at a second test point in said second ignition circuit; and
- d) if said second resultant test voltage detected in said step c) is outside of an acceptable second voltage range, then responsively thereto indicating a cross-coupling fault exists between said first ignition circuit and said second ignition circuit.

15. The method according to claim 14, wherein said second resultant test voltage at said second test point in said second ignition circuit is influenced by said first resultant test voltage through said cross-coupling fault between said first ignition circuit and said second ignition circuit.

16. The method according to claim 14, wherein said step c) is carried out simultaneously with said step a).

17. The method according to claim 16, wherein said step c) is carried out with said second triggering switch in an open state.

18. The method according to claim 14, wherein said step c) is carried out with said second triggering switch in an open state.

19. The method according to claim 14, wherein said step c) is carried out without applying an input test voltage to said second ignition circuit.

* * * * *

UNITED STATES PATENT AND TRADEMARK OFFICE
CERTIFICATE OF CORRECTION

PATENT NO. : 6,218,739 B1
DATED : April 17, 2001
INVENTOR(S) : Fendt

Page 1 of 1

It is certified that error appears in the above-identified patent and that said Letters Patent is hereby corrected as shown below:

Title page,
Under Item [57] ABSTRACT, line 8, before "circuit" replace "closed" by -- quiescent open --.

Column 2,
Line 16, after "triggered.", replace "In the closed-circuit state," by -- On the other hand, in the quiescent resting state or open-circuit starting state in which the switching means 1.x and 2.x are open, --;
Line 18, before "potential", replace "closed-circuit" by -- quiescent or open-circuit starting --;
Line 29, after "the", replace "closed circuit" by -- quiescent --;
Line 33, after "the", replace "closed circuit" by -- quiescent --;
Line 36, after "the", replace "closed circuit" by -- quiescent --;
Line 39, after "of", replace "closed" by -- quiescent --;
Line 40, before "potential", delete "circuit";
Line 55, after "the" (first occurrence) replace "closed circuit" by -- quiescent --;

Signed and Sealed this

Second Day of April, 2002

*Attest:*

JAMES E. ROGAN
*Attesting Officer*     *Director of the United States Patent and Trademark Office*